United States Patent
Kříž et al.

(10) Patent No.: US 12,548,355 B2
(45) Date of Patent: Feb. 10, 2026

(54) AUTOMATIC SELECTION OF STRUCTURES-OF-INTEREST FOR LAMELLA SAMPLE PREPARATION

(71) Applicant: FEI COMPANY, Hillsboro, OR (US)

(72) Inventors: Radim Kříž, Hillsboro, OR (US);
Matej Dolník, Hillsboro, OR (US);
Marko Vrábel, Hillsboro, OR (US)

(73) Assignee: FEI COMPANY, Hillsboro, OR (US)

( * ) Notice: Subject to any disclaimer, the term of this patent is extended or adjusted under 35 U.S.C. 154(b) by 848 days.

(21) Appl. No.: 17/832,212

(22) Filed: Jun. 3, 2022

(65) Prior Publication Data
US 2023/0394852 A1 Dec. 7, 2023

(51) Int. Cl.
*G01N 1/28* (2006.01)
*G02B 21/16* (2006.01)
(Continued)

(52) U.S. Cl.
CPC .......... *G06V 20/698* (2022.01); *G02B 21/16* (2013.01); *G06T 7/0012* (2013.01); *G06T 7/10* (2017.01); *G06T 7/60* (2013.01); *G06T 7/70* (2017.01); *G06V 10/764* (2022.01); *G06V 20/695* (2022.01); *H01J 37/222* (2013.01); *H01J 37/28* (2013.01); *H01J 37/3053* (2013.01); *G06T 2207/10056* (2013.01); *G06T 2207/20021* (2013.01); *G06T 2207/30024* (2013.01)

(58) Field of Classification Search
CPC ...... G06V 20/695; G06V 20/698; G06T 7/10; G06T 7/11; G06T 2207/10056; H01J 37/3053; G01N 2001/2873; G01N 1/286
See application file for complete search history.

(56) References Cited

U.S. PATENT DOCUMENTS

| 2014/0226003 A1 | 8/2014 | Phaneuf et al. |
| 2022/0091407 A1 | 3/2022 | Abbey et al. |
| 2023/0093535 A1* | 3/2023 | Karlík ...................... G06T 7/11 |
| | | 250/492.3 |

OTHER PUBLICATIONS

European Patent Office Notification of Publication for Application No. 23176964.7, dated Nov. 8, 2023 (2 pages).
(Continued)

*Primary Examiner* — Kent Yip
(74) *Attorney, Agent, or Firm* — Michael Best & Friedrich LLP

(57) ABSTRACT

Disclosed herein are scientific instrument support systems, as well as related methods, computing devices, and computer-readable media. For example, in some embodiments, a support apparatus is provided for a charged particle microscope. The support apparatus is configured to apply automated image processing to an image representing a lamella sample to segment the image into a plurality of segmented classes. The support apparatus is also configured to identify, based on the plurality of segmented classes, a subset of candidate structures-of-interest in the lamella sample and to select, from the subset of candidate structures-of-interest in the lamella sample, a selected structure-of-interest for milling. The support apparatus is also configured to set, based on the selected structure-of-interest for milling, at least one milling parameter for the scientific instrument. An automated method performed via a computing device for providing such scientific instrument support is also provided.

18 Claims, 8 Drawing Sheets

(51) Int. Cl.
*G06T 7/00* (2017.01)
*G06T 7/10* (2017.01)
*G06T 7/60* (2017.01)
*G06T 7/70* (2017.01)
*G06V 10/764* (2022.01)
*G06V 20/69* (2022.01)
*H01J 37/22* (2006.01)
*H01J 37/28* (2006.01)
*H01J 37/305* (2006.01)

(56) References Cited

OTHER PUBLICATIONS

Ronneberger et al., "U-Net: Convolutional Networks for Biomedical Image Segmentation", arXiv, 2015, 8 pages.
Albumentations, "Albumentations: fast and flexible image augmentations", <https://albumentations.ai/>, 2020, 3 pages.
European Patent Office Search Report for Application No. 23176964.7, dated Oct. 18, 2023 (10 pages).
Serra Lleti et al., "CLEMSite, a software for automated phenotypic screens using light microscopy and FIB-SEM," bioRxiv, Jul. 29, 2021, pp. 1-23.
European Patent Office. Office Action for Application No. 23176964.7, dated Apr. 16, 2025 (8 pages).

* cited by examiner

AUTOMATIC SELECTION OF STRUCTURES-OF-INTEREST FOR LAMELLA SAMPLE PREPARATION

BACKGROUND

Microscopy is the technical field of using microscopes to better view objects that are difficult to see with the naked eye. One branch of microscopy, known as charged particle (e.g., electron and/or ion) microscopy, involves using a beam of accelerated charged particles as a source of illumination. Types of charged particle microscopy include, for example, transmission electron microscopy (TEM), scanning electron microscopy (SEM), scanning transmission electron microscopy, and ion beam microscopy. Lamella samples are used with TEM microscopes, which is a thin layer, membrane, or plate of tissue. Lamella samples are prepared on charged particle microscope, such as a dual beam microscope including an SEM column and an ion beam column from structures-of-interest (e.g., cells, microcrystal electron diffraction (MicroED) crystals, and the like) placed on an electron microscopy grid. In some instances, cryogenic lamella samples are used, which include samples vitrified through fast freezing.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

DETAILED DESCRIPTION

Figure 1:
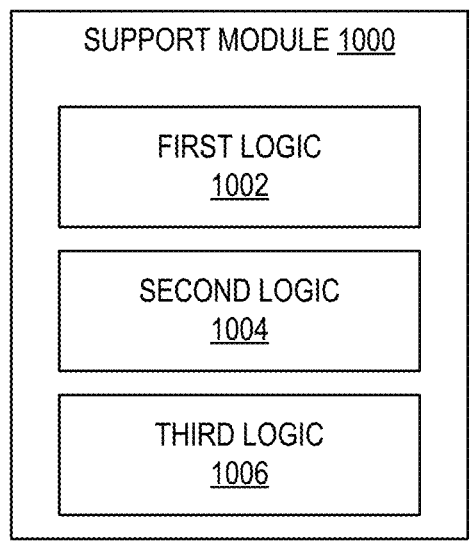
FIG. 1 is a block diagram of an example scientific instrument support module for performing support operations, in accordance with various embodiments.

Disclosed herein are scientific instrument support systems, as well as related methods, computing devices, and computer-readable media. For example, according to one embodiment, a support apparatus is provided for a scientific instrument (e.g., a charged particle microscope). The support apparatus, which may be implemented by a common computing device included in the scientific instrument or remote from the scientific instrument or implemented or implemented by a plurality of computing devices included in the scientific instrument, remote from the scientific instrument, or a combination thereof, is configured to apply automated image processing to an image representing a lamella sample to segment the image into a plurality of segmented classes. The support apparatus is also configured to identify, based on the plurality of segmented classes, a subset of candidate structures-of-interest in the lamella sample and to select, from the subset of candidate structures-of-interest in the lamella sample, a selected structure-of-interest for milling. The support apparatus is also configured to set, based on the selected structure-of-interest for milling, at least one milling parameter for the scientific instrument. An automated method performed via a computing device for providing such scientific instrument support is also provided.

The scientific instrument support embodiments disclosed herein may achieve improved performance relative to conventional approaches. For example, conventional approaches to lamella preparation involve manual steps. Manual user interaction is required, for example, in selecting cells in a tissue sample (or other types of structures-of-interest in a cryogenic lamella sample) that are suitable for further preparation. This step requires trained microscopists and is time consuming and subject to errors. The embodiments disclosed herein thus provide improvements to scientific instrument technology (e.g., improvements in the computer technology supporting such scientific instruments, among other improvements) through the use of automated detection of structures-of-interest suitable for lamella preparation using image segmentation applied via a machine learning model, wherein automatically detected structures-of-interest are used to set milling parameters for the sample, such as, for example, milling angle. Accordingly, embodiments disclosed herein improve cryogenic lamella sample preparation.

The embodiments disclosed herein may achieve improved speed, accuracy, and reliability relative to conventional approaches. For example, conventional approaches rely on human microscopists to visually analyze lamella images to manually select structures-of-interest for milling and preparation. This approach suffers from a number of technical problems and limitations, including requiring increased storage time for samples prior to preparation, due to the limited workflow capacity of human microscopists. Increased storage leads to increased costs and increased chances for degradation of or accidental damage to the samples. Manual structure-of-interest selection slows the preparation process at the initial step, introducing delays from the start to other processes, which depend upon the preparation of the lamella sample.

Various ones of the embodiments disclosed herein may improve upon conventional approaches to achieve the technical advantages of improved accuracy of operations performed in subsequent steps of the cryogenic lamella preparation process, higher throughput, and increased cost efficiency by automatically selecting structures-of-interest for preparation. Such technical advantages are not achievable by routine and conventional approaches, and all users of systems including such embodiments may benefit from these advantages (e.g., by assisting the user in the performance of a technical task, such as cryogenic lamella sample preparation, by means of an automated process using machine learning models). The technical features of the embodiments disclosed herein are thus decidedly unconventional in the field of cryogenic lamella sample preparation, as are the combinations of the features of the embodiments disclosed herein. As discussed further herein, various aspects of the embodiments disclosed herein may improve the functionality of a computer itself; for example, as described herein, computing devices employ machine learning to segment images of lamella samples, and can improve their accuracy for future operations by receiving feedback on their past results. The computational and user interface features disclosed herein do not only involve the collection and comparison of information but apply new analytical and technical techniques to change the operation of scientific instruments used in cryogenic lamella sample preparation. The present disclosure thus introduces functionality that neither a conventional computing device, nor a human, could perform.

Accordingly, the embodiments of the present disclosure may serve any of a number of technical purposes, such as controlling a specific technical system or process; determining from measurements how to control a machine; image enhancement or analysis; providing estimates and confidence intervals for biological samples; or simulating the behavior of a technical item or process. In particular, the present disclosure provides technical solutions to technical problems, including but not limited to automated selection of structures-of-interest suitable for cryogenic lamella preparation. The embodiments disclosed herein thus provide improvements to cryogenic lamella preparation technology associated with scientific instruments (e.g., improvements in the computer technology supporting cryogenic lamella preparation technology, among other improvements).

In the following detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made, without departing from the scope of the present disclosure. Therefore, the following detailed description is not to be taken in a limiting sense.

Various operations may be described as multiple discrete actions or operations in turn, in a manner that is most helpful in understanding the subject matter disclosed herein. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

For the purposes of the present disclosure, the phrases "A and/or B" and "A or B" mean (A), (B), or (A and B). For the purposes of the present disclosure, the phrases "A, B, and/or C" and "A, B, or C" mean (A), (B), (C), (A and B), (A and C), (B and C), or (A, B, and C). Although some elements may be referred to in the singular (e.g., "a processing device"), any appropriate elements may be represented by multiple instances of that element, and vice versa. For example, a set of operations described as performed by a processing device may be implemented with different ones of the operations performed by different processing devices.

The description uses the phrases "an embodiment," "various embodiments," and "some embodiments," each of which may refer to one or more of the same or different embodiments. Furthermore, the terms "comprising," "including," "having," and the like, as used with respect to embodiments of the present disclosure, are synonymous. When used to describe a range of dimensions, the phrase "between X and Y" represents a range that includes X and Y. As used herein, an "apparatus" may refer to any individual device, collection of devices, part of a device, or collections of parts of devices. The drawings are not necessarily to scale.

FIG. 1 is a block diagram of a scientific instrument support module 1000 for performing support operations, in accordance with various embodiments. The scientific instrument support module 1000 may be implemented by circuitry (e.g., including electrical and/or optical components), such as a programmed computing device. The logic of the scientific instrument support module 1000 may be included in a single computing device, or may be distributed across multiple computing devices that are in communication with each other as appropriate. Examples of computing devices that may, singly or in combination, implement the scientific instrument support module 1000 are discussed herein with reference to the computing device 7000 of FIG. 7, and examples of systems of interconnected computing devices, in which the scientific instrument support module 1000 may be implemented across one or more of the computing devices, is discussed herein with reference to the scientific instrument support system 8000 of FIG. 8.

The scientific instrument support module 1000 may include first logic 1002, second logic 1004, and third logic 1006 for performing support methods as described herein for a scientific instrument, such as, for example, a dual-beam instrument described below with respect to FIG. 9 used to prepare lamella samples, such as, for example, cryogenic lamella samples. As used herein, the term "logic" may include an apparatus that is to perform a set of operations associated with the logic. For example, any of the logic elements included in the support module 1000 may be implemented by one or more computing devices programmed with instructions to cause one or more processing devices of the computing devices to perform the associated set of operations. In a particular embodiment, a logic element may include one or more non-transitory computer-readable media having instructions thereon that, when executed by one or more processing devices of one or more computing devices, cause the one or more computing devices to perform the associated set of operations. As used herein, the term "module" may refer to a collection of one or more logic elements that, together, perform a function associated with the module. Different ones of the logic elements in a module may take the same form or may take different forms. For example, some logic in a module may be implemented by a programmed general-purpose processing device, while other logic in a module may be implemented by an application-specific integrated circuit (ASIC). In another example, different ones of the logic elements in a module may be associated with different sets of instructions executed by one or more processing devices. A module may not include all of the logic elements depicted in the associated drawing; for example, a module may include a subset of the logic elements depicted in the associated drawing when that module is to perform a subset of the operations discussed herein with reference to that module.

Figure 2:
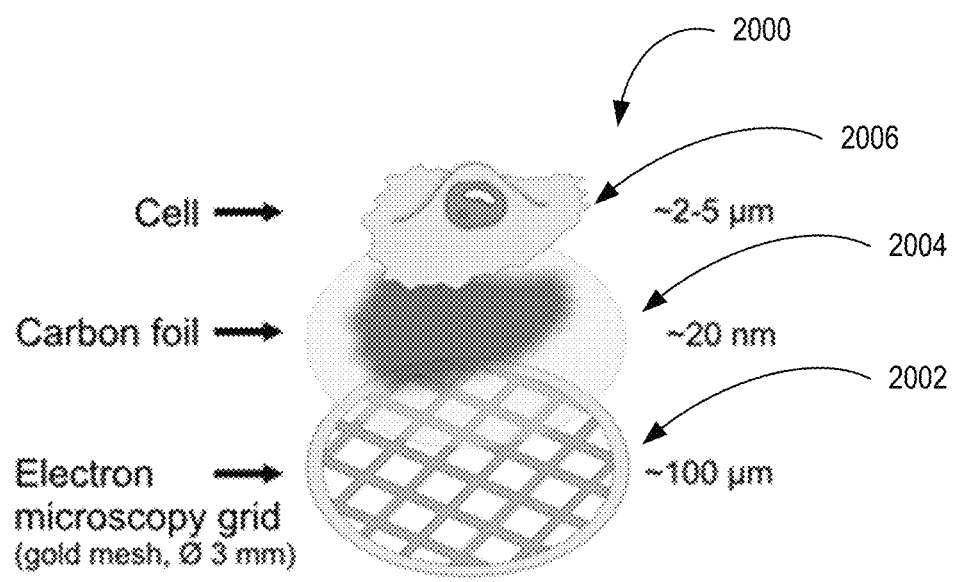
FIG. 2 illustrates a lamella sample operated on by a scientific instrument, in accordance with various embodiments.

The first logic 1002 may apply automated image processing to an image representing a lamella sample to segment the image into segmented classes, for example, a plurality of structures-of-interest, a plurality of grid squares, a plurality of cracks, and a plurality of contaminants. FIG. 2 illustrates an example lamella sample 2000. The lamella sample illustrated in FIG. 2 comprises three layers. The first layer is the grid layer 2002, for example, an "autogrid," including a ring filled by an electron microscopy grid defined by grid bars arranged in a perpendicular fashion. The grid bars intersect to produce "grid squares," as described herein. In some embodiments, the grid layer 2002 is made in part from a gold mesh. The second layer is the foil layer 2004, which is comprised of a carbon foil (e.g., a "quantifoil") disposed on the grid layer 2002. The third layer is the tissue layer 2006, which is comprised of structures-of-interest (e.g., vitrified cells when preparing cryogenic lamella samples) disposed on top of the foil layer 2004. Returning to FIG. 1, the first logic 1002 may analyze and classify each pixel of the image into one of a group of pre-defined categories, including structures-of-interest, grid bars, cracks, contaminants (e.g., ice), grid edges, and background (i.e., the foil layer).

In some embodiments, first logic 1002 may acquire an image representing the lamella sample (e.g., the image 4000 of FIG. 4A) by causing a scientific instrument (e.g., the scientific instrument 9000 of FIG. 9) to scan the lamella sample with an electron beam or an ion beam of the scientific instrument. In some embodiments, the first logic 1002 may acquire an image representing the lamella sample from an optical microscope. In some embodiments, the first logic 1002 applies automated image processing to segment the image by processing the image with a convolutional neural network trained using a plurality annotated images of lamella samples, as described herein with respect to FIG. 5.

The second logic 1004 may identify, based on the plurality of segmented classes, a subset of candidate structures-of-interest (e.g., cells) in the lamella sample. For example, as described in more detail with respect to FIG. 3 and the method 3000, the second logic 1004 identifies which structures-of-interest are contained within grid squares (i.e., not positioned on a grid bar) and identifies those as candidate structures-of-interest. The second logic 1004 identifies a subset of secondary grid squares in the lamella sample and excludes structures-of-interest located in those squares from the subset of candidate structures-of-interest. Secondary grid squares are characterized as being unsuitable or unusable for milling purposes. For example, where the foil located within a grid square contains a crack, that grid square may be deemed unusable. In another example, a grid square that contains too many contaminants (e.g., ice crystals) may be deemed unusable. As described in more detail with respect to FIG. 3 and the method 3000, candidate structures-of-interest may also be chosen based on their distance from grid bars, other structures-of-interest, and the grid edge. As described in more detail with respect to FIG. 3 and the method 3000, some structures-of-interest may be excluded from the subset of candidate structures-of-interest because of the presence of other structures-of-interest or contaminants between the structure-of-interest and an ion beam source (used for milling).

The second logic 1004 may also select, from the subset of candidate structures-of-interest in the lamella sample, one or more selected structures-of-interest for milling. As would be understood by one skilled in the art, not all candidate structures-of-interest are equally suitable for the subsequent steps of cryogenic lamella preparation, including milling. For example, given two structures-of-interest located within grid squares, the structure-of-interest closest to the center of its grid square may be more suitable. In another example, a structure-of-interest may contain or be within a region of interest (e.g., as identified in a fluorescence light microscope image), which may make that structure-of-interest more suitable than others not in a region of interest. As described in more detail with respect to FIG. 3 and the method 3000, the second logic 1004 performs automated operations to select structures-of-interest based on, among other things, its position and one or more regions of interest.

The third logic 1006 may set, based on a selected structure-of-interest for milling, at least one milling parameter for the scientific instrument. For example, the third logic 1006 may generate a milling angle, a milling time, a milling pattern, or the like based on the location and size of the selected structure-of-interest. In some embodiments, the third logic 1006 may generate and/or transmit control commands (e.g., based on the at least one milling parameter) to a scientific instrument to cause the scientific instrument to mill the selected structure-of-interest.

Figure 3:
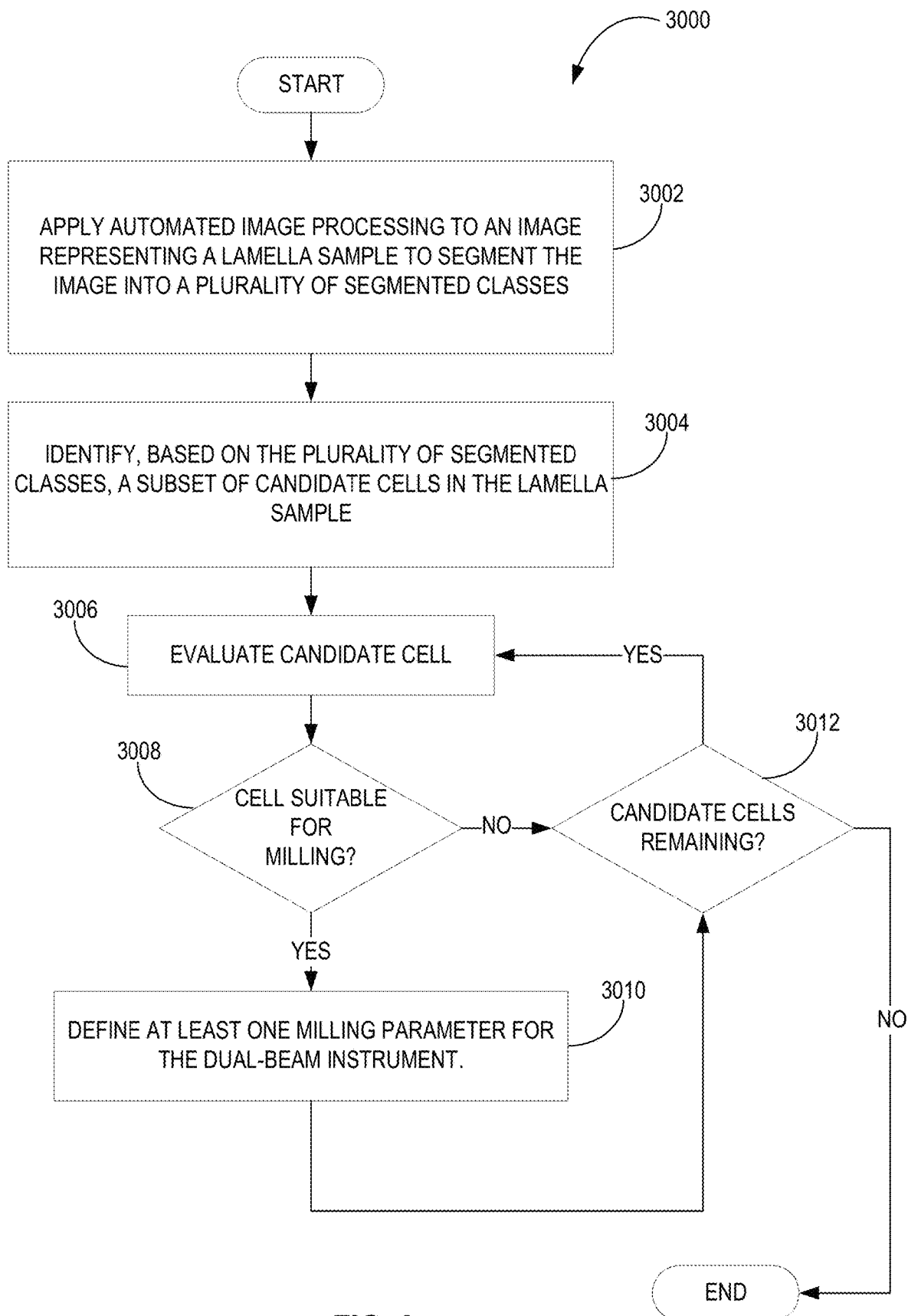
FIG. 3 is a flow diagram of an example method of performing support operations, in accordance with various embodiments.

FIG. 3 is a flow diagram of a method 3000 of performing support operations, in accordance with various embodiments. Although the operations of the method 3000 may be illustrated with reference to particular embodiments disclosed herein (e.g., the scientific instrument support modules 1000 discussed herein with reference to FIG. 1, the computing devices 7000 discussed herein with reference to FIG. 7, and/or the scientific instrument support system 8000 discussed herein with reference to FIG. 8), the method 3000 may be used in any suitable setting to perform any suitable support operations. Operations are illustrated once each and in a particular order in FIG. 3, but the operations may be reordered and/or repeated as desired and appropriate (e.g., different operations performed may be performed in parallel, as suitable). By way of example, operations of the method 3000 may be described as being performed by one of the first, second, or third logics 1002, 1004, and 1006 of the scientific instrument support module 1000. However, it should be understood that the operations may be distributed in various ways among any number of logics or processing devices. It should be understood that embodiments of the method 3000 may be used to select on-the-grid structures-of-interest such as, for example, vitrified cells and microcrystal electron diffraction (MicroED) crystals.

Figure 4A:
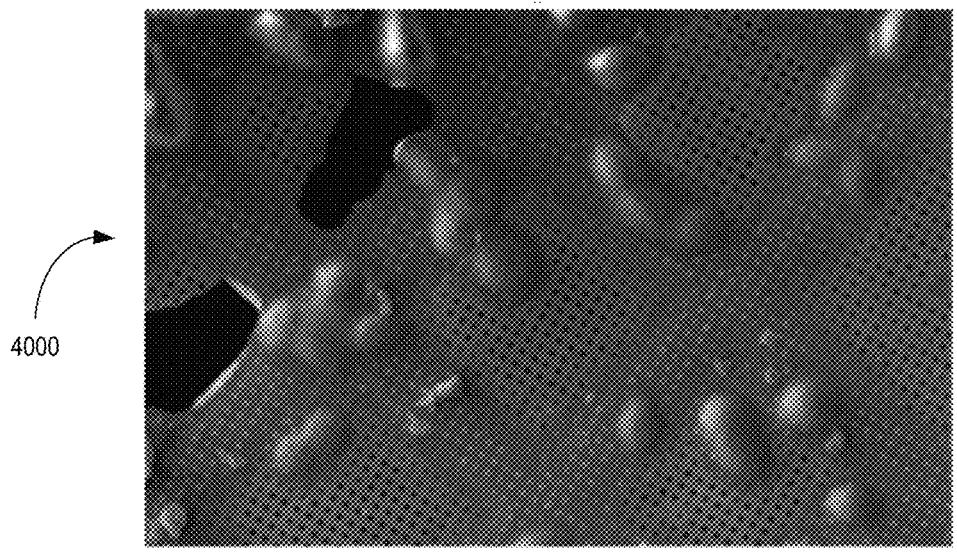
FIG. 4A is an example image of a lamella sample, in accordance with various embodiments.
Figure 4B:
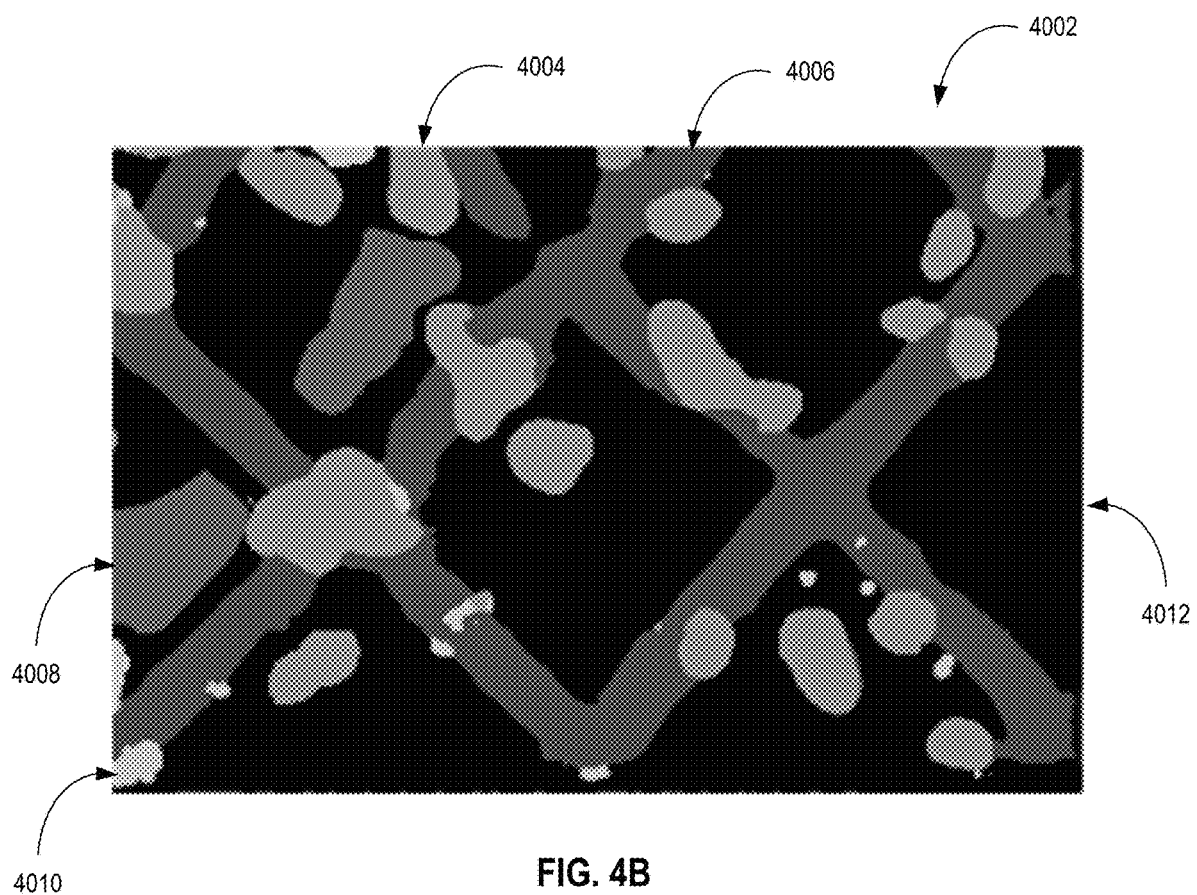
FIG. 4B is an example segmented image of the image of FIG. 4A, produced using the method of FIG. 3, in accordance with various embodiments.

At block 3002, the first logic 1002 applies automated image processing to an image representing a lamella sample to segment the image into a plurality of segmented images. For example, the first logic 1002 may segment the image into a plurality of structures-of-interest (in the illustrated example, cells), a plurality of grid squares, a plurality of cracks, and a plurality of contaminants. In some embodiments, the first logic 1002 acquires the image representing the lamella sample by causing a charged particle microscope (e.g., the dual-beam instrument 9000) to scan the lamella sample with an electron beam (e.g., the electron beam 9014) of the charged particle microscope or an ion beam of the charged particle microscope. In some embodiments, the first logic 1002 acquires the image representing the lamella sample from an optical microscope. In some embodiments, the first logic 1002 acquires and operates on a data set, which defines the image representing the lamella sample (e.g., which may have been digitally scanned and pre-processed outside of the first logic 1002). FIG. 4A illustrates an example image 4000. FIG. 4B illustrates an example segmented image 4002 produced by the first logic 1002. The first logic 1002 segments the image 4000 by analyzing and classifying each pixel of the image into one of a group of pre-defined categories, including structures-of-interest (in the illustrated example, cells), grid bars, cracks, contaminants (e.g., ice), grid edges, and background (i.e., the foil layer). Adjacent pixels of the same category (i.e., segmented class) are grouped into "blobs" forming objects classified as, for example, a structure-of-interest 4004, a grid line 4006, a crack 4008, a contaminant 4010, and the background 4012. In some embodiments, the first logic 1002 identifies grid squares (and their positions relative to one another) by analyzing the gird bars to identify and locate intersections of grid bars, which form the corners of the grid squares. Because the mesh can be assumed to be substantially uniform, the first logic 1002 may reconstruct obstructed or imperfectly detected grid bars and grid squares. In some embodiments, the first logic 1002 may apply known information about the lamella sample during image segmentation. For example, the size and location of grid squares, the width of grid bars, and other similar characteristics of the lamella sample may be taken into account during image segmentation to improve the segmentation process.

Figure 5:
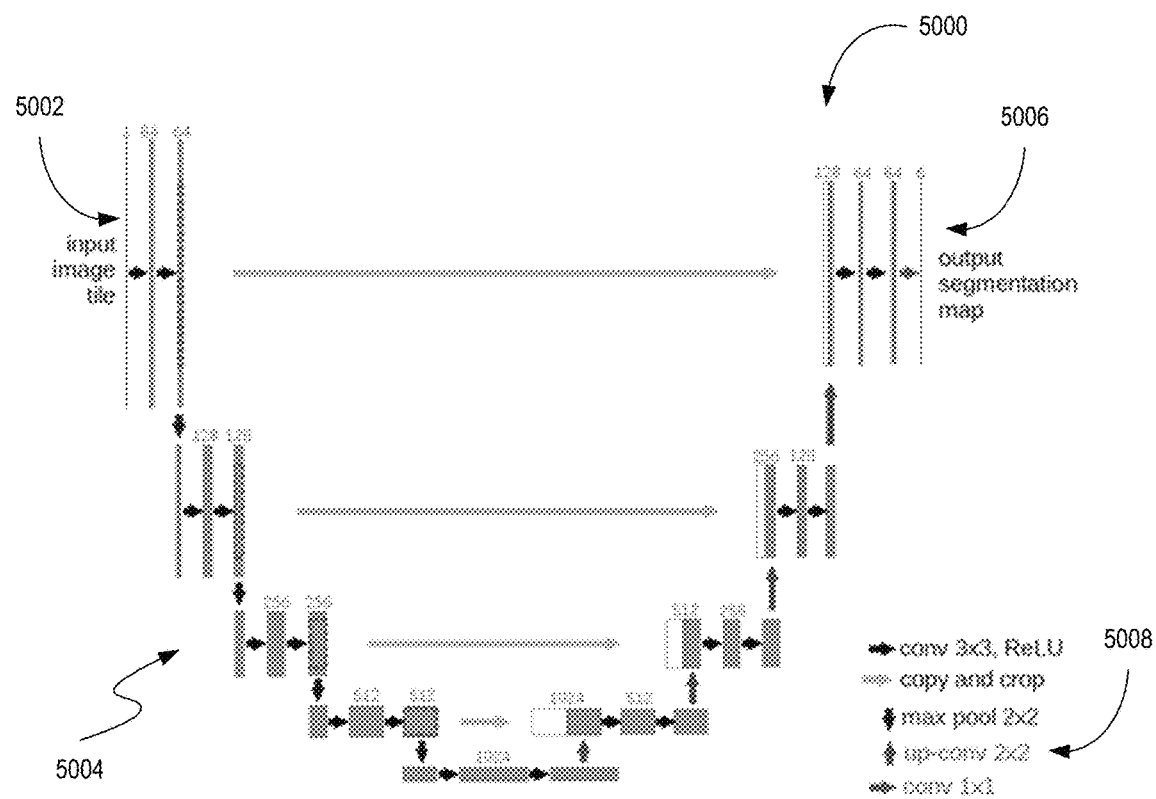
FIG. 5 is a block diagram of an example neural network for performing image segmentation, in accordance with various embodiments.

In some embodiments, the first logic 1002 applies automated image processing to segment the image by processing the image with machine learning, for example, a convolutional neural network trained using a plurality of lamella samples. For example, the first logic 1002 may implement a U-net architecture 5000, as illustrated in FIG. 5. The first logic 1002 feeds an input image 5002 (e.g., the image 4000) to the neural network 5004, which produces a segmentation map 5006 (e.g., the image 4002). In other embodiments, the first logic 1002 applies other neural network architectures or other automated image processing techniques to segment the image.

In some embodiments, the U-net architecture 5000 includes the repeated application of two 3×3 convolutions (unpadded convolutions), each followed by a rectified linear unit (ReLU) and a 2×2 max pooling operation with stride 2 for down sampling. At each down sampling step, the number of feature channels is doubled. Every step in the expansive path consists of an up sampling of the feature map followed by a 2×2 convolution ("up-convolution") that halves the number of feature channels, a concatenation with the correspondingly cropped feature map from the contracting path, and two 3×3 convolutions, each followed by a ReLU. The cropping is due to the loss of border pixels in every convolution. At the final layer, a 1×1 convolution is used to map each 64-component feature vector to the desired number of classes. In total the illustrated network has 23 convolutional layers.

Each shaded box corresponds to a multi-channel feature map, with the number of channels is denoted on top of the box. White boxes represent copied feature maps. The arrows (as defined in the key 5008) denote the different operations of the neural network 5004.

The neural network 5004 is trained using images of lamella samples and ground truth images corresponding to those samples. During training, the input images are of shape (512, 768, 1) for height, width, and number of channels, respectively. The output of the network is of shape (512, 768, 6) where 6 denotes the number of predicted binary segmentation maps. The final multiclass segmentation map is obtained by performing a pixel-wise argmax operation on the output of the network. To ensure the same shape of inputs and outputs, padding is introduced during up-convolutions.

In some embodiments, during training, training images are augmented, and each batch has differently augmented images. This is done to artificially enhance the amount of input images, which in turn prevents overfitting, because "different" images are fed to the network each iteration. Each augmentation is performed with some probability p. Examples of possible training image augmentations include resize to uniform height and width (p=1); horizontal flip (p=0.5); vertical flip (p=0.5); coarse dropout (p=0.2); Contrast Limited Adaptive Histogram Equalization (p=0.5); one of (p=0.3): gaussian blur, downscale, gaussian noise, or sharpen; and one of (p=0.3): random brightness contrast, random gamma, embossing, or standard normalization.

After the image has been segmented, at block 3004, the second logic 1004 identifies, based on the plurality of segmented classes, a subset of candidate structures-of-interest in the lamella sample. The second logic 1004 performs post-processing on the image, as described below, to determine which of the structures-of-interest might be chosen for further processing (e.g., milling) during the cryogenic lamella preparation process.

Figure 6A:
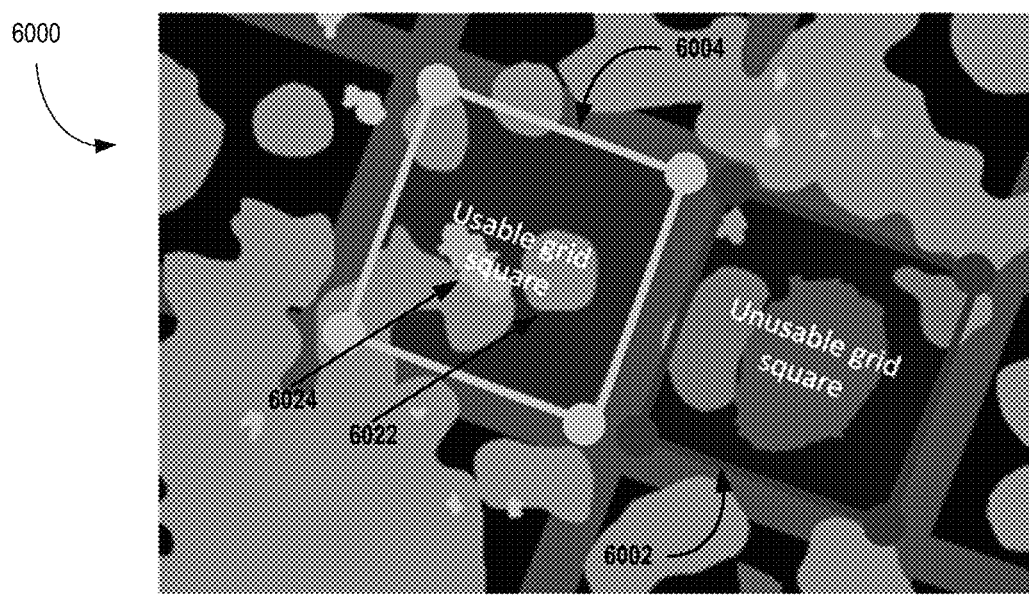
FIGS. 6A-6C are images illustrating aspects of the operation of the method of FIG. 3, in accordance with various embodiments.

In some embodiments, the second logic 1004 determines, based on the plurality of grid squares, the plurality of cracks, and the plurality of contaminants, a subset of secondary grid squares. Secondary grid squares are characterized as being unsuitable or unusable for milling purposes because, for example, during application of the tissue layer, freezing, and subsequent storage and transportation of the lamella sample, it is possible that the foil layer is damaged (e.g., cracked) or that contaminants (e.g., ice crystals, dust particles, and the like) are introduced. In the embodiments described herein, each of the subset of secondary grid squares contains one or both of a crack or a contaminant. The second logic 1004 may use image analysis to determine which grid squares are unusable. FIG. 6A illustrates an example segmented image 6000 of a portion of a lamella sample. As illustrated in FIG. 6A, where a crack is fully or partially present in a grid square (e.g., grid square 6002), the second logic 1004 may determine that the grid square should be added to the subset of secondary grid squares. Similarly, where a contaminant is fully or partially present in a grid square, the second logic 1004 may determine that the grid square should be added to the subset of secondary grid squares. In some embodiments, the contaminant (individually or in aggregate) may have to exceed a threshold amount in order to render a grid square unusable. Because the size of the pixels is known, the second logic 1004 can determine the size of any part of the image under analysis, including contaminants. For example, as illustrated in FIG. 6A, contaminant 6024 is present in grid square 6004, which is still classified as a usable grid square because the contaminant is below a threshold size.

Figure 6B:
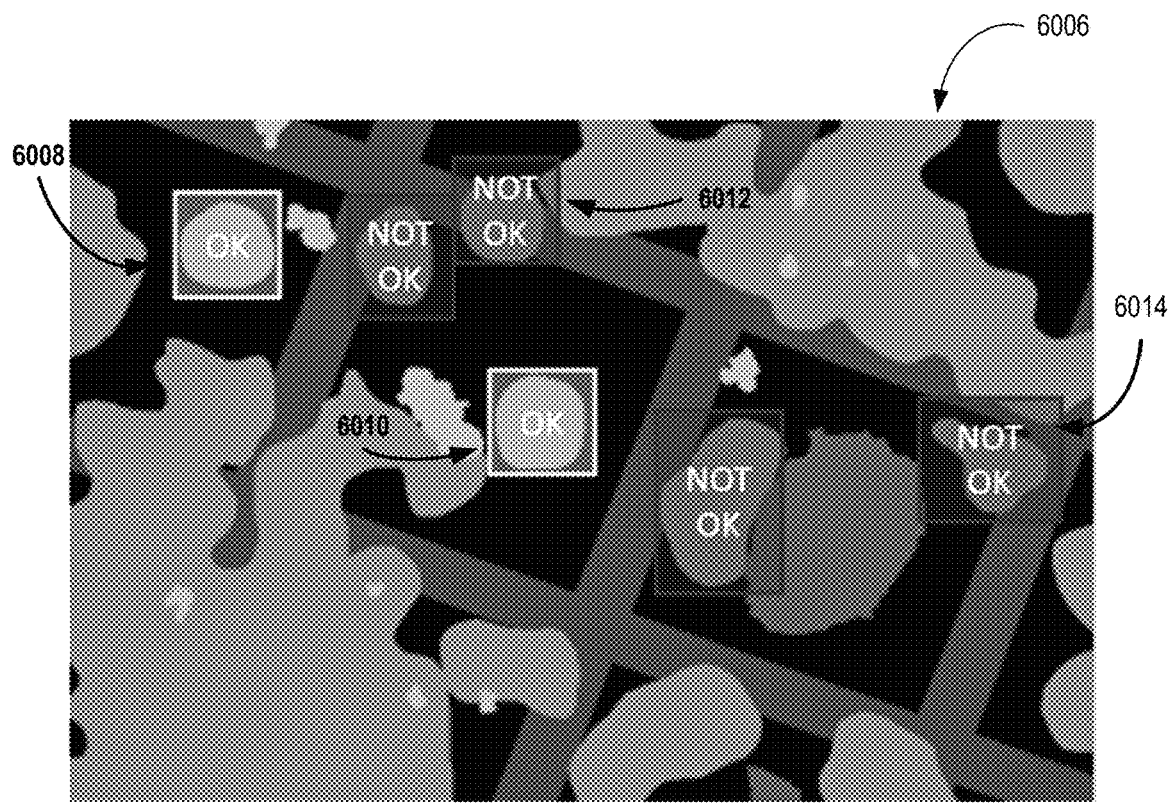

In some embodiments, the second logic 1004 determines, for each of the plurality of structures-of-interest, a position of the structure-of-interest and a size of the structure-of-interest and, based on the position of the structure-of-interest and the size of the structure-of-interest, whether the structure-of-interest is contained within one of the plurality of grid squares. As noted, by using a known pixel size, dimensions for objects and distances within the image can be measured. FIG. 6B illustrates an example segmented image 6006 of a portion of a lamella sample. In order for a structure-of-interest to be milled, it must be fully contained in a grid square, and not layered on top of a grid bar. As illustrated in FIG. 6B, structures-of-interest 6008 and 6010, which are contained within grid squares, are identified as candidate structures-of-interest, while structures-of-interest 6012 and 6014, which are not contained within grid squares, are excluded. The second logic 1004 may identify those structures-of-interest, which are contained within a grid square as candidate structures-of-interest for milling. However, if a structure-of-interest is contained within an unusable grid square, it cannot be milled. Accordingly, the second logic 1004 may identify the subset of candidate structures-of-interest by selecting for inclusion in the subset of candidate structures-of-interest only those structures-of-interest not located within one of the subset of secondary grid squares.

The second logic 1004 may further narrow the subset of candidate structures-of-interest based on other parameters. In some embodiments, for example, the second logic 1004 may exclude a structure-of-interest from the subset of candidate structures-of-interest if the distance between the structure-of-interest and a grid bar is below a grid bar distance threshold. In such embodiments, the second logic 1004 may, for each of the plurality of structures-of-interest that is contained within one of the plurality of grid squares, determine a distance between the structure-of-interest and a grid bar of the grid square containing the structure-of-interest and compare the distance to the grid bar distance threshold. In some embodiments, the grid bar distance threshold is set to between 1 and 2 micrometers.

Figure 6C:
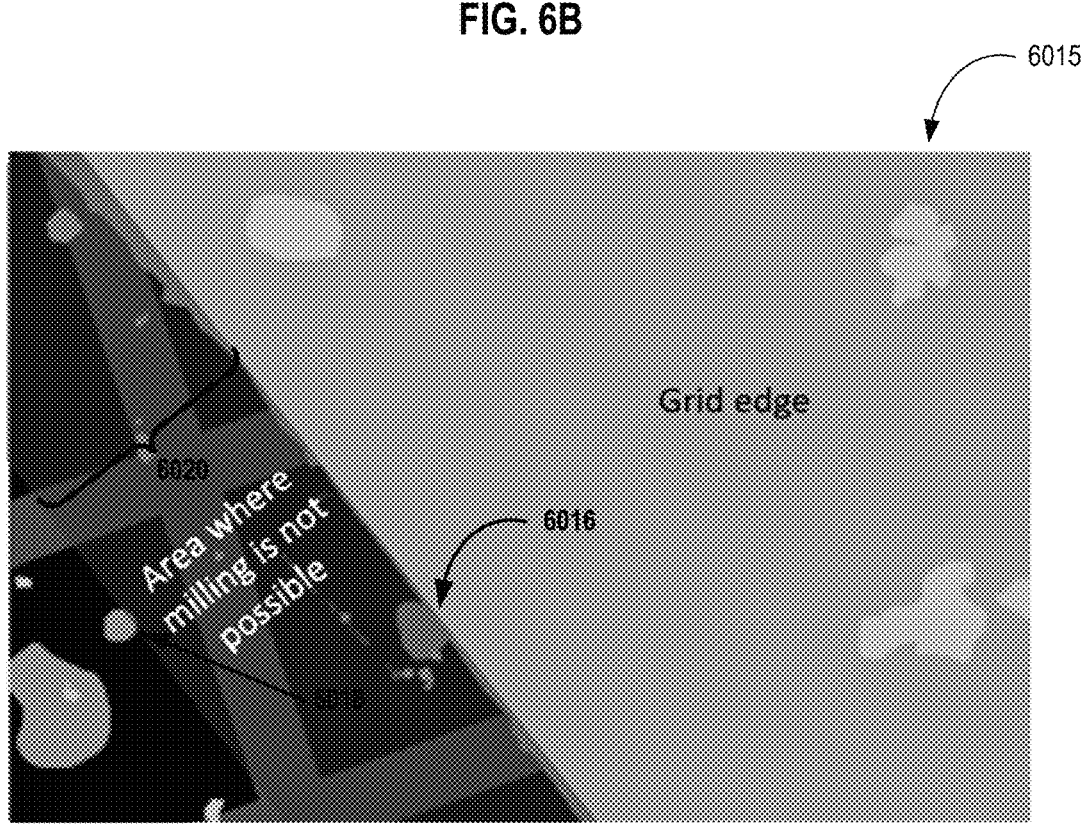

In some embodiments, the second logic 1004 excludes a structure-of-interest from the subset of candidate structures-of-interest if the distance between the structure-of-interest and the grid edge is below a grid edge distance threshold. In such embodiments, the second logic 1004 may, for each of the plurality of structures-of-interest that is contained within one of the plurality of grid squares, determine a distance between the structure-of-interest and the grid edge and compare the distance to the grid edge distance threshold. For example, as illustrated in FIG. 6C, the second logic 1004 has classified a grid edge 6016 in the segmented image 6015. Because the structure-of-interest 6018 is within the grid edge distance threshold 6020, the second logic 1004 rules it out as a candidate for milling even though it is contained within a grid square. In some embodiments, the grid edge distance threshold is set to between 100 and 200 micrometers.

In some embodiments, the second logic 1004 excludes a structure-of-interest from the subset of candidate structures-of-interest if the distance between the structure-of-interest and another of the plurality of structures-of-interest contained with the same grid square is below a structure-of-interest distance threshold. In such embodiments, the second logic 1004 may, for each of the plurality of structures-of-interest that is contained within one of the plurality of grid squares, determining a distance between the structure-of-interest and another of the plurality of structures-of-interest contained with the same grid square as the structure-of-interest and compare the distance to the structure-of-interest distance threshold. In some embodiments, the structure-of-interest distance threshold is set to between 5 and 10 micrometers. The structure-of-interest distance may differ based on the type of the structure-of-interest being selected.

In some embodiments, the second logic 1004 excludes a structure-of-interest from the subset of candidate structures-of-interest if it is shaded by any obstacle (e.g., another structure-of-interest or a contaminant) in the direction of the milling to be performed by the ion beam. In such embodiments, the second logic 1004 may determine a milling zone for the structure-of-interest based on the position of the structure-of-interest and a location of a milling beam emitter (e.g., the ion beam 9024). The milling zone represents an area in the directing of the milling beam emitter, in which an obstacle would interfere with the milling process. The second logic 1004 determines whether any of the plurality of structures-of-interest or any of the plurality of contaminants is present in the milling zone. In response to determining that one or both of a structure-of-interest or a contaminant is present in the milling zone, the second logic 1004 excludes the structure-of-interest from the subset of candidate structures-of-interest. For example, as illustrated in FIG. 6A, the structure-of-interest 6022 is contained in a grid square, but the contaminant 6024 may lie in the milling zone for the structure-of-interest 6022, excluding the structure-of-interest from the subset of candidate structures-of-interest even though it is within an otherwise usable grid square.

The second logic 1004, at blocks 3006-3012, selects, from the subset of candidate structures-of-interest in the lamella sample, one or more selected structures-of-interest for milling. At block 3006, the second logic 1004 evaluates a first structure-of-interest of the subset of candidate structures-of-interest.

In some embodiments, the second logic 1004 evaluates the candidate structures-of-interest based on their location within their respective grid squares, selecting structures-of-interest based on which of the plurality of structures-of-interest that is contained within one of the plurality of grid squares is located closest to a center of the grid square containing the candidate structure-of-interest.

In some embodiments, the second logic 1004 evaluates the candidate structures-of-interest based on whether adjacent grid squares contain candidate structures-of-interest, selecting structures-of-interest based on which of the plurality of structures-of-interest is contained within an isolated grid square (i.e., a square containing no neighboring candidate structures-of-interest).

In some embodiments, the second logic 1004 evaluates the candidate structures-of-interest based on whether they contain or are contained within a region of interest (e.g., as defined by a fluorescence light microscope image stack of the same lamella sample represented by the segmented image). A region of interest is an identified area of the cryogenic lamella sample, which may include, for example, an outline of a tumor, a cellular anomaly, or other biological structure to be analyzed when the cryogenic lamella sample is milled. In such embodiments, the second logic 1004 acquires a fluorescence light microscope image stack for the structure-of-interest or the lamella sample (e.g., from the remote computing device 8040 or another suitable source). The second logic 1004 determines, based image analysis of the fluorescence light microscope image stack, whether a region of interest is present in the structure-of-interest and, in response to determining that the region of interest is present in the structure-of-interest, selects the structure-of-interest as a selected structure-of-interest.

If the candidate structure-of-interest, upon evaluation (at block 3006) is identified as suitable (at block 3008), in some embodiments, the third logic 1006 or another processing device (e.g., the processing device 7002) sets, based on the selected structure-of-interest for milling, at least one milling parameter for the dual-beam instrument. For example, the third logic 1006 may generate a milling angle, a milling time, a milling pattern, or the like based on the location and size of the selected structure-of-interest. In some embodiments, the third logic 1006 controls (e.g., by issuing electronic commands) a dual-beam instrument (e.g., the dual-beam instrument 9000) to mill the selected structure-of-interest using an ion beam (e.g., the ion beam 9024) of the dual-beam instrument. As illustrated in FIG. 3, after a candidate structure-of-interest is identified as suitable (at block 3010) or not suitable (at block 3008), the third logic 1006 continues to evaluate remaining candidate structures-of-interest (at block 3012) until all candidate structures-of-interest are evaluated and the method 3000 ends.

Figure 7:
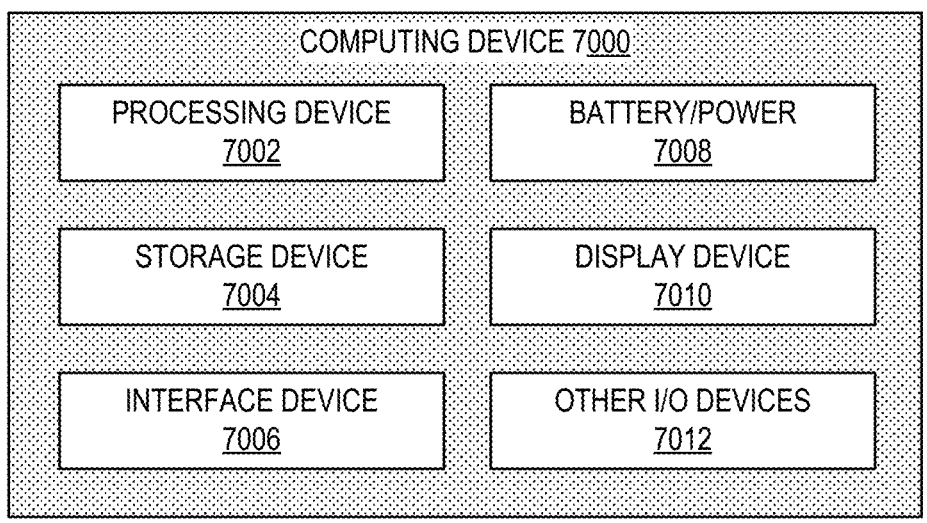
FIG. 7 is a block diagram of an example computing device that may perform some or all of the scientific instrument support methods disclosed herein, in accordance with various embodiments.
Figure 8:
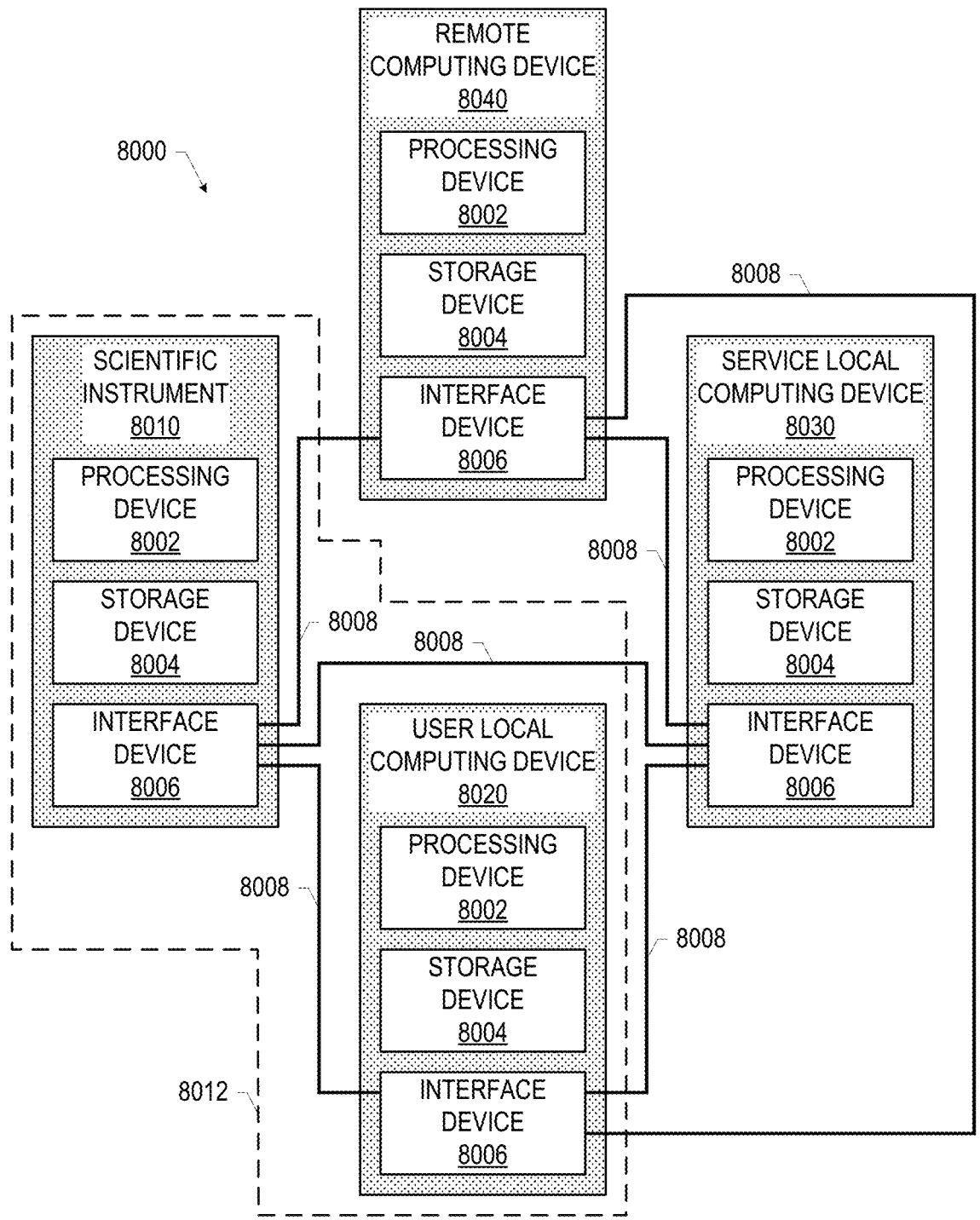
FIG. 8 is a block diagram of an example scientific instrument support system in which some or all of the scientific instrument support methods disclosed herein may be performed, in accordance with various embodiments.

The scientific instrument support methods disclosed herein may include interactions with a human user (e.g., via the user local computing device 8020 discussed herein with reference to FIG. 8). These interactions may include providing information to the user (e.g., information regarding the operation of a scientific instrument such as the scientific instrument 8010 of FIG. 8, information regarding a sample being analyzed or other test or measurement performed by a scientific instrument, information retrieved from a local or remote database, or other information) or providing an option for a user to input commands (e.g., to control the operation of a scientific instrument such as the scientific instrument 8010 of FIG. 8, or to control the analysis of data generated by a scientific instrument), queries (e.g., to a local or remote database), or other information. In some embodiments, these interactions may be performed through a graphical user interface (GUI) that includes a visual display on a display device (e.g., the display device 7010 discussed herein with reference to FIG. 7) that provides outputs to the user and/or prompts the user to provide inputs (e.g., via one or more input devices, such as a keyboard, mouse, trackpad, or touchscreen, included in the other I/O devices 7012 discussed herein with reference to FIG. 7). The scientific instrument support systems disclosed herein may include any suitable GUIs for interaction with a user.

As noted above, the scientific instrument support module 1000 may be implemented by one or more computing devices. FIG. 7 is a block diagram of a computing device 7000 that may perform some or all of the scientific instrument support methods disclosed herein, in accordance with various embodiments. In some embodiments, the scientific instrument support module 1000 may be implemented by a single computing device 7000 or by multiple computing devices 7000. Further, as discussed below, a computing device 7000 (or multiple computing devices 7000) that implements the scientific instrument support module 1000 may be part of one or more of the scientific instrument 8010, the user local computing device 8020, the service local computing device 8030, or the remote computing device 8040 of FIG. 8.

The computing device 7000 of FIG. 7 is illustrated as having a number of components, but any one or more of these components may be omitted or duplicated, as suitable for the application and setting. In some embodiments, some or all of the components included in the computing device 7000 may be attached to one or more motherboards and enclosed in a housing (e.g., including plastic, metal, and/or other materials). In some embodiments, some these components may be fabricated onto a single system-on-a-chip (SoC) (e.g., an SoC may include one or more processing devices 7002 and one or more storage devices 7004). Additionally, in various embodiments, the computing device 7000 may not include one or more of the components illustrated in FIG. 7, but may include interface circuitry (not shown) for coupling to the one or more components using any suitable interface (e.g., a Universal Serial Bus (USB) interface, a High-Definition Multimedia Interface (HDMI) interface, a Controller Area Network (CAN) interface, a Serial Peripheral Interface (SPI) interface, an Ethernet interface, a wireless interface, or any other appropriate interface). For example, the computing device 7000 may not include a display device 7010, but may include display device interface circuitry (e.g., a connector and driver circuitry) to which a display device 7010 may be coupled.

The computing device 7000 may include a processing device 7002 (e.g., one or more processing devices). As used herein, the term "processing device" may refer to any device or portion of a device that processes electronic data from registers and/or memory to transform that electronic data into other electronic data that may be stored in registers and/or memory. The processing device 7002 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices.

The computing device 7000 may include a storage device 7004 (e.g., one or more storage devices). The storage device 7004 may include one or more memory devices such as random access memory (RAM) (e.g., static RAM (SRAM) devices, magnetic RAM (MRAM) devices, dynamic RAM (DRAM) devices, resistive RAM (RRAM) devices, or conductive-bridging RAM (CBRAM) devices), hard drive-based memory devices, solid-state memory devices, networked drives, cloud drives, or any combination of memory devices. In some embodiments, the storage device 7004 may include memory that shares a die with a processing device 7002. In such an embodiment, the memory may be used as cache memory and may include embedded dynamic random access memory (eDRAM) or spin transfer torque magnetic random access memory (STT-MRAM), for example. In some embodiments, the storage device 7004 may include non-transitory computer readable media having instructions thereon that, when executed by one or more processing devices (e.g., the processing device 7002), cause the computing device 7000 to perform any appropriate ones of or portions of the methods disclosed herein.

The computing device 7000 may include an interface device 7006 (e.g., one or more interface devices 7006). The interface device 7006 may include one or more communication chips, connectors, and/or other hardware and software to govern communications between the computing device 7000 and other computing devices. For example, the interface device 7006 may include circuitry for managing wireless communications for the transfer of data to and from the computing device 7000. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not. Circuitry included in the interface device 7006 for managing wireless communications may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). In some embodiments, circuitry included in the interface device 7006 for managing wireless communications may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. In some embodiments, circuitry included in the interface device 7006 for managing wireless communications may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). In some embodiments, circuitry included in the interface device 7006 for managing wireless communications may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. In some embodiments, the interface device 7006 may include one or more antennas (e.g., one or more antenna arrays) to receipt and/or transmission of wireless communications.

In some embodiments, the interface device 7006 may include circuitry for managing wired communications, such as electrical, optical, or any other suitable communication protocols. For example, the interface device 7006 may include circuitry to support communications in accordance with Ethernet technologies. In some embodiments, the interface device 7006 may support both wireless and wired communication, and/or may support multiple wired communication protocols and/or multiple wireless communication protocols. For example, a first set of circuitry of the interface device 7006 may be dedicated to shorter-range wireless communications such as Wi-Fi or Bluetooth, and a second set of circuitry of the interface device 7006 may be dedicated to longer-range wireless communications such as global positioning system (GPS), EDGE, GPRS, CDMA, WiMAX, LTE, EV-DO, or others. In some embodiments, a first set of circuitry of the interface device 7006 may be dedicated to wireless communications, and a second set of circuitry of the interface device 7006 may be dedicated to wired communications.

The computing device 7000 may include battery/power circuitry 7008. The battery/power circuitry 7008 may include one or more energy storage devices (e.g., batteries or capacitors) and/or circuitry for coupling components of the computing device 7000 to an energy source separate from the computing device 7000 (e.g., AC line power).

The computing device 7000 may include a display device 7010 (e.g., multiple display devices). The display device 7010 may include any visual indicators, such as a heads-up display, a computer monitor, a projector, a touchscreen display, a liquid crystal display (LCD), a light-emitting diode display, or a flat panel display.

The computing device 7000 may include other input/output (I/O) devices 7012. The other I/O devices 7012 may include one or more audio output devices (e.g., speakers, headsets, earbuds, alarms, etc.), one or more audio input devices (e.g., microphones or microphone arrays), location devices (e.g., GPS devices in communication with a satellite-based system to receive a location of the computing device 7000, as known in the art), audio codecs, video codecs, printers, sensors (e.g., thermocouples or other temperature sensors, humidity sensors, pressure sensors, vibration sensors, accelerometers, gyroscopes, etc.), image capture devices such as cameras, keyboards, cursor control devices such as a mouse, a stylus, a trackball, or a touchpad, bar code readers, Quick Response (QR) code readers, or radio frequency identification (RFID) readers, for example.

The computing device 7000 may have any suitable form factor for its application and setting, such as a handheld or mobile computing device (e.g., a structure-of-interest phone, a smart phone, a mobile internet device, a tablet computer, a laptop computer, a netbook computer, an ultrabook computer, a personal digital assistant (PDA), an ultra mobile personal computer, etc.), a desktop computing device, or a server computing device or other networked computing component.

One or more computing devices implementing any of the scientific instrument support modules or methods disclosed herein may be part of a scientific instrument support system. FIG. 8 is a block diagram of an example scientific instrument support system 8000 in which some or all of the scientific instrument support methods disclosed herein may be performed, in accordance with various embodiments. The scientific instrument support modules and methods disclosed herein (e.g., the scientific instrument support module 1000 of FIG. 1 and the method 3000 of FIG. 3) may be implemented by one or more of the scientific instrument 8010, the user local computing device 8020, the service local computing device 8030, or the remote computing device 8040 of the scientific instrument support system 8000.

Any of the scientific instrument 8010, the user local computing device 8020, the service local computing device 8030, or the remote computing device 8040 may include any of the embodiments of the computing device 7000 discussed herein with reference to FIG. 7, and any of the scientific instrument 8010, the user local computing device 8020, the service local computing device 8030, or the remote computing device 8040 may take the form of any appropriate ones of the embodiments of the computing device 7000 discussed herein with reference to FIG. 7.

The scientific instrument 8010, the user local computing device 8020, the service local computing device 8030, or the remote computing device 8040 may each include a processing device 8002, a storage device 8004, and an interface device 8006. The processing device 8002 may take any suitable form, including the form of any of the processing devices 7002 discussed herein with reference to FIG. 7, and the processing devices 8002 included in different ones of the scientific instrument 8010, the user local computing device 8020, the service local computing device 8030, or the remote computing device 8040 may take the same form or different forms. The storage device 8004 may take any suitable form, including the form of any of the storage devices 7004 discussed herein with reference to FIG. 7, and the storage devices 8004 included in different ones of the scientific instrument 8010, the user local computing device 8020, the service local computing device 8030, or the remote computing device 8040 may take the same form or different forms. The interface device 8006 may take any suitable form, including the form of any of the interface devices 7006 discussed herein with reference to FIG. 7, and the interface devices 8006 included in different ones of the scientific instrument 8010, the user local computing device 8020, the service local computing device 8030, or the remote computing device 8040 may take the same form or different forms.

The scientific instrument 8010, the user local computing device 8020, the service local computing device 8030, and the remote computing device 8040 may be in communication with other elements of the scientific instrument support system 8000 via communication pathways 8008. The communication pathways 8008 may communicatively couple the interface devices 8006 of different ones of the elements of the scientific instrument support system 8000, as shown, and may be wired or wireless communication pathways (e.g., in accordance with any of the communication techniques discussed herein with reference to the interface devices 4006 of the computing device 7000 of FIG. 7). The particular scientific instrument support system 8000 depicted in FIG. 8 includes communication pathways between each pair of the scientific instrument 8010, the user local computing device 8020, the service local computing device 8030, and the remote computing device 8040, but this "fully connected" implementation is simply illustrative, and in various embodiments, various ones of the communication pathways 8008 may be absent. For example, in some embodiments, a service local computing device 8030 may not have a direct communication pathway 8008 between its interface device 8006 and the interface device 8006 of the scientific instrument 8010, but may instead communicate with the scientific instrument 8010 via the communication pathway 8008 between the service local computing device 8030 and the user local computing device 8020 and the communication pathway 8008 between the user local computing device 8020 and the scientific instrument 8010.

The scientific instrument 8010 may comprise any appropriate scientific instrument, such as, for example, a dual-beam instrument. FIG. 9 illustrates the scientific instrument 8010 implemented as a dual-beam instrument 9000 according to some embodiments. The dual-beam instrument 9000 may include an electron-beam instrument, such as, for example, a SEM instrument or column 9002, and an ion-beam instrument, such as, for example, a FIB or PFIB instrument or column 9004, wherein the SEM column 9002 and the FIB column 9004 are both coupled to a vacuum chamber 9008. The vacuum chamber 9008 houses a movable sample holder 9010 and is evacuated using one or more vacuum pumps (not explicitly shown in FIG. 9). In an example embodiment, the holder 9010 is independently movable parallel to the XY-coordinate plane and parallel to the Z-coordinate axis (see coordinate system illustrated in FIG. 9). A sample S to be processed using the dual-beam instrument 9000 may be mounted in holder 9010 as indicated in FIG. 9. As illustrated in FIG. 9, the example embodiment includes a computing device 7000 as generally described above with respect to FIG. 7. The computing device 7000 may be configured to send and receive one or more control signals as described below and, in some embodiments, may perform the support methods described herein. However, as noted above, in other embodiments, the method may be performed remote from the scientific instrument 8010 via one or more external computing devices 7000. Accordingly, the inclusion of the computing device 7000 in the dual-beam instrument 9000 represents one possible embodiment of such a scientific instrument.

Figure 9:
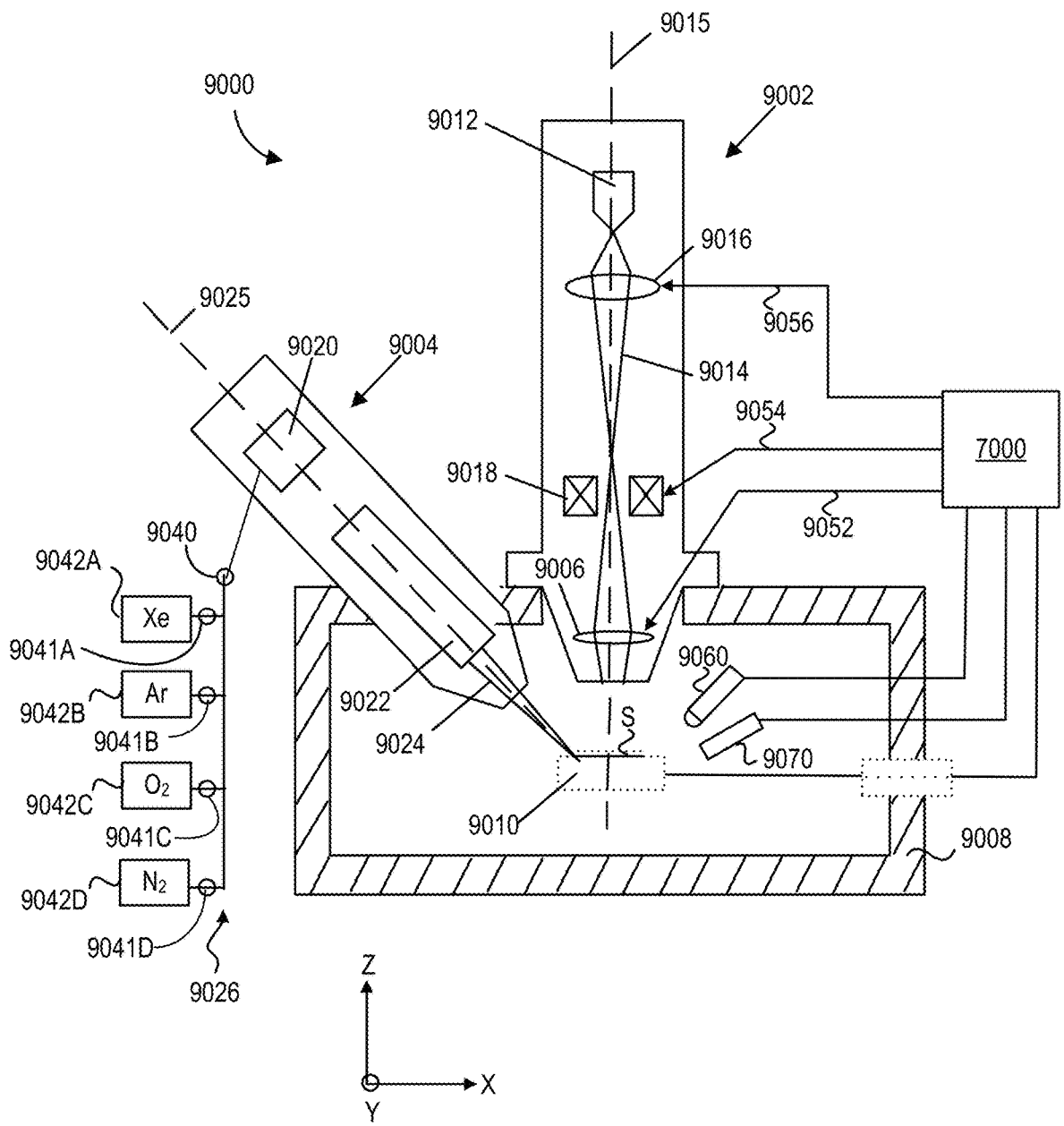
FIG. 9 is a block diagram of an example scientific instrument included in the scientific instrument support system of FIG. 8, in accordance with various embodiments.

The SEM column 9002 may comprise an electron source 9012 and one or more CPB lenses, only two of which (e.g., an objective lens 9006 and a condenser lens 9016) are shown in FIG. 9. In alternative embodiments, the SEM column 9002 may include a different number of CPB lenses. In an example embodiment, the objective lens 9006 comprises an ultra-high resolution (UHR) lens (also sometimes referred to as an immersion lens) but other types of CPB lenses may be used. At least one of the CPB lenses of the SEM column 9002 has an adjustable setting that controls a magnetic force applied via the CPB lens (e.g., via varying AT levels).

The SEM column 9002 may also comprise a deflection unit 9018 that steers the electron beam 9014 in response to a control signal 9054. Such beam steering may be used to move a focused portion of the electron beam 9014 along a desired path across the sample S (e.g., to perform a raster or vector scan of the sample S).

In operation, the electron source 9012 produces an electron beam 9014 propagating generally along a longitudinal axis 9015 of the SEM column 9002. The objective lens 9006 and the condenser lens 9016 generate electric and magnetic fields that affect the electron trajectories of the electron beam 9014. Control signals 9052, 9056 may be used to change the strengths and/or spatial configurations of the fields generated via the objective lens 9006 and the condenser lens 9016 to impart desired properties on the electron beam 9014. In general, the objective lens 9006 and the condenser lens 9016, the control signals 9052 and 9056, and other pertinent components of the dual-beam instrument 9000 perform various operations and support various functions, such as beam focusing, aberration mitigation, aperture cropping, filtering, etc.

The FIB column 9004 may comprise an ion source 9020 and ion-beam optics 9022. In the illustrated embodiment, the ion source 9020 is a plasma source connected to a plurality of gas volumes 9042 by way of a gas manifold 9026. For illustration purposes and without any implied limitations, FIG. 9 illustrates four gas volumes 9042A, 9042B, 9042C, and 9042D. Gas flows through the manifold 9026 are controlled by valves 9040 and 9041A-9041D. More specifically, the valves 9041A-9041D are used to select individual gases stored in volumes 9042A-9042D, respectively, or make mixtures thereof for the ion source 9020. The valve 9040 may be used to control the flow of the selected gas(es) from gas manifold 9026 to the ion source 9020. As an example, FIG. 9 illustrates volumes 9042A-9042D as containing xenon, argon, oxygen, and nitrogen gases, respectively. Other suitable gases may similarly be loaded into some or all of volumes 9042A-9042D. Also, in other embodiments, the gas manifold 9026 may be connected to a different number of gas volumes 9042. Also, in other embodiments, the ion source 9020 may comprise a liquid metal ion source (LMIS) or any other ion source compatible with the FIB column 9004 and with the dual-beam instrument 9000 in general.

In operation, the ion source 9020 ionizes the gas(es) received through the valve 9040 from the gas manifold 9026, thereby forming a plasma. Ions extracted from the plasma are then accelerated through the FIB column 9004 to form an ion beam 9024 propagating generally along a longitudinal axis 9025 of the FIB column 9004. In an example embodiment, the longitudinal axis 9025 is oriented at a non-zero angle (e.g., in a range between approximately 30 degrees and 60 degrees) with respect to the longitudinal axis 9015. In the example embodiment illustrated in FIG. 9, the axis 9015 is a vertical axis, whereas the axis 9025 is a tilted axis. In other embodiments, other spatial arrangements of the columns 9002 and 9004 are also possible.

Ion-beam optics 9022 may be used, among other things, to focus the ion beam 9024 at the sample S and to move a focused portion of the ion beam 9024 along a desired path across the sample S (e.g., to perform a raster or vector scan of the sample S). As indicated above, the ion beam 9024 may be used to perform imaging of the sample S and/or machining operations, such as, for example, incising, milling, etching, depositing, and the like.

The dual-beam instrument 9000 may also comprise detectors 9060, 9070 located in the vacuum chamber 9008. The specific types of the detectors 9060, 9070 may depend on the embodiment of the dual-beam instrument 9000 and may be chosen from a variety of detector types suitable for detecting different types of "stimulated" emission and/or radiation from the sample S in response to the electron beam 9014 and/or ion beam 9024. For example, in one possible embodiment, the detector 9060 may be a solid-state detector (e.g., a photodiode) capable of detecting cathodoluminescence emanating from the sample S, and the detector 9070 may be an electron detector capable of detecting backscattered and/or secondary electrons emanating from the sample S.

By scanning the electron beam 9014 or the ion beam 9024 across the surface of the sample S, different portions of the sample may be probed in a controllable and spatially resolved manner. Since the corresponding stimulated emission/radiation is typically position-dependent, the measurement results generated by the detectors 9060, 9070 may be coupled with the scan-path information to produce spatially resolved information. For example, measurement results and scan-path information may be processed to produce images of sample S, other suitable representations of the information, or a combination thereof.

Returning to FIG. 8, the user local computing device 8020 may be a computing device (e.g., in accordance with any of the embodiments of the computing device 7000 discussed herein) that is local to a user of the scientific instrument 8010. In some embodiments, the user local computing device 8020 may also be local to the scientific instrument 8010, but this need not be the case; for example, a user local computing device 8020 that is in a user's home or office may be remote from, but in communication with, the scientific instrument 8010 so that the user may use the user local computing device 8020 to control and/or access data from the scientific instrument 8010. In some embodiments, the user local computing device 8020 may be a laptop, smartphone, or tablet device. In some embodiments the user local computing device 8020 may be a portable computing device.

The service local computing device 8030 may be a computing device (e.g., in accordance with any of the embodiments of the computing device 7000 discussed herein) that is local to an entity that services the scientific instrument 8010. For example, the service local computing device 8030 may be local to a manufacturer of the scientific instrument 8010 or to a third-party service company. In some embodiments, the service local computing device 8030 may communicate with the scientific instrument 8010, the user local computing device 8020, and/or the remote computing device 8040 (e.g., via a direct communication pathway 8008 or via multiple "indirect" communication pathways 8008, as discussed above) to receive data regarding the operation of the scientific instrument 8010, the user local computing device 8020, and/or the remote computing device 8040 (e.g., the results of self-tests of the scientific instrument 8010, calibration coefficients used by the scientific instrument 8010, the measurements of sensors associated with the scientific instrument 8010, etc.). In some embodiments, the service local computing device 8030 may communicate with the scientific instrument 8010, the user local computing device 8020, and/or the remote computing device 8040 (e.g., via a direct communication pathway 8008 or via multiple "indirect" communication pathways 8008, as discussed above) to transmit data to the scientific instrument 8010, the user local computing device 8020, and/or the remote computing device 8040 (e.g., to update programmed instructions, such as firmware, in the scientific instrument 8010, to initiate the performance of test or calibration sequences in the scientific instrument 8010, to update programmed instructions, such as software, in the user local computing device 8020 or the remote computing device 8040, etc.). A user of the scientific instrument 8010 may utilize the scientific instrument 8010 or the user local computing device 8020 to communicate with the service local computing device 8030 to report a problem with the scientific instrument 8010 or the user local computing device 8020, to request a visit from a technician to improve the operation of the scientific instrument 8010, to order consumables or replacement parts associated with the scientific instrument 8010, or for other purposes.

The remote computing device 8040 may be a computing device (e.g., in accordance with any of the embodiments of the computing device 7000 discussed herein) that is remote from the scientific instrument 8010 and/or from the user local computing device 8020. In some embodiments, the remote computing device 8040 may be included in a datacenter or other large-scale server environment. In some embodiments, the remote computing device 8040 may include network-attached storage (e.g., as part of the storage device 8004). The remote computing device 8040 may store data generated by the scientific instrument 8010, perform analyses of the data generated by the scientific instrument 8010 (e.g., in accordance with programmed instructions), facilitate communication between the user local computing device 8020 and the scientific instrument 8010, and/or facilitate communication between the service local computing device 8030 and the scientific instrument 8010.

In some embodiments, one or more of the elements of the scientific instrument support system 8000 illustrated in FIG. 8 may not be present. Further, in some embodiments, multiple ones of various ones of the elements of the scientific instrument support system 8000 of FIG. 8 may be present. For example, a scientific instrument support system 8000 may include multiple user local computing devices 8020 (e.g., different user local computing devices 8020 associated with different users or in different locations). In another example, a scientific instrument support system 8000 may include multiple scientific instruments 8010, all in communication with service local computing device 8030 and/or a remote computing device 8040; in such an embodiment, the service local computing device 8030 may monitor these multiple scientific instruments 8010, and the service local computing device 8030 may cause updates or other information may be "broadcast" to multiple scientific instruments 8010 at the same time. Different ones of the scientific instruments 8010 in a scientific instrument support system 8000 may be located close to one another (e.g., in the same room) or farther from one another (e.g., on different floors of a building, in different buildings, in different cities, etc.). In some embodiments, a scientific instrument 8010 may be connected to an Internet-of-Things (IoT) stack that allows for command and control of the scientific instrument 8010 through a web-based application, a virtual or augmented reality application, a mobile application, and/or a desktop application. Any of these applications may be accessed by a user operating the user local computing device 8020 in communication with the scientific instrument 8010 by the intervening remote computing device 8040. In some embodiments, a scientific instrument 8010 may be sold by the manufacturer along with one or more associated user local computing devices 8020 as part of a local scientific instrument computing unit 8012.

In some embodiments, different ones of the scientific instruments 8010 included in a scientific instrument support system 8000 may be different types of scientific instruments 8010. In some such embodiments, the remote computing device 8040 and/or the user local computing device 8020 may combine data from different types of scientific instruments 8010 included in a scientific instrument support system 8000.

According to an example embodiment disclosed above, e.g., in reference to any one or any combination of some or all of FIGS. 1-9, provided is an apparatus comprising: a first logic configured to apply automated image processing to an image representing a lamella sample to segment the image into a plurality of segmented classes; a second logic configured to: identify, based on the plurality of segmented classes, a subset of candidate structures-of-interest in the lamella sample; and select, from the subset of candidate structures-of-interest in the lamella sample, a selected structure-of-interest for milling; and a third logic configured to set, based on the selected structure-of-interest for milling, at least one milling parameter for the scientific instrument.

In some embodiments of the above apparatus, at least two of the first logic, the second logic, and the third logic are implemented by a common computing device.

In some embodiments of any of the above apparatus, at least one of the first logic, the second logic, and the third logic is implemented by a computing device remote from the scientific instrument.

In some embodiments of any of the above apparatus, at least one of the first logic, the second logic, and the third logic is implemented in the scientific instrument.

In some embodiments of any of the above apparatus, the first logic is further configured to acquire the image representing the lamella sample by causing the scientific instrument to scan the lamella sample with at least one selected from the group consisting of an electron beam of the scientific instrument and an ion beam of the scientific instrument.

In some embodiments of any of the above apparatus, the first logic is further configured to apply automated image processing to segment the image by processing the image with a convolutional neural network trained using a plurality of annotated images of lamella samples.

In some embodiments of any of the above apparatus, the plurality of segmented classes includes at least one selected from the group consisting of a plurality of structures-of-interest, a plurality of grid squares, a plurality of cracks, a plurality of contaminants, and a background.

In some embodiments of any of the above apparatus, the second logic is further configured to determine, based on the plurality of grid squares, the plurality of cracks, and the plurality of contaminants, a subset of secondary grid squares, wherein each of the subset of secondary grid squares contains one or both of a crack or a contaminant; determine, for each of the plurality of structures-of-interest, a position of the structure-of-interest and a size of the structure-of-interest; determine, for each of the plurality of structures-of-interest, based on the position of the structure-of-interest and the size of the structure-of-interest, whether the structure-of-interest is contained within one of the plurality of grid squares; and identify the subset of candidate structures-of-interest by, for each of the plurality of structures-of-interest that is contained within one of the plurality of grid squares, selecting the structure-of-interest for inclusion in the subset of candidate structures-of-interest if the structure-of-interest is not located within one of the subset of secondary grid squares.

In some embodiments of any of the above apparatus, the second logic is further configured to, for each of the plurality of structures-of-interest that is contained within one of the plurality of grid squares: determine a distance between the structure-of-interest and a grid bar of the grid square containing the structure-of-interest; and exclude the structure-of-interest from the subset of candidate structures-of-interest if the distance between the structure-of-interest and the grid bar is below a grid bar distance threshold In some embodiments of any of the above apparatus, the first logic is further configured to apply automated image processing to the image to further segment the image into a grid edge and the second logic is further configured to, for each of the plurality of structures-of-interest that is contained within one of the plurality of grid squares: determine a distance between the structure-of-interest and the grid edge; and exclude the structure-of-interest from the subset of candidate structures-of-interest if the distance between the structure-of-interest and the grid edge is below a grid edge distance threshold.

In some embodiments of any of the above apparatus, the second logic is further configured to, for each of the plurality of structures-of-interest that is contained within one of the plurality of grid squares: determine a distance between the structure-of-interest and another of the plurality of structures-of-interest contained with the same grid square as the structure-of-interest; and exclude the structure-of-interest from the subset of candidate structures-of-interest if the distance between the structure-of-interest and another of the plurality of structures-of-interest contained with the same grid square is below a structure-of-interest distance threshold.

In some embodiments of any of the above apparatus, the second logic is further configured to, for each of the plurality of structures-of-interest that is contained within one of the plurality of grid squares: determine a milling zone for the structure-of-interest based on the position of the position of the structure-of-interest and a location of a milling beam emitter; determine whether any of the plurality of structures-of-interest is present in the milling zone; determine whether any of the plurality of contaminants is present in the milling zone; and responsive to determining that one or both of a structure-of-interest or a contaminant is present in the milling zone, excluding the structure-of-interest from the subset of candidate structures-of-interest.

In some embodiments of any of the above apparatus, the second logic is further configured to select a selected structure-of-interest for milling by selecting the selected structure-of-interest based on which of the plurality of structures-of-interest that is contained within one of the plurality of grid squares is located closest to a center of the grid square containing the structure-of-interest.

In some embodiments of any of the above apparatus, the second logic is further configured to, for each of the plurality of structures-of-interest that is contained within one of the plurality of grid squares: acquire a fluorescence light microscope image stack for the structure-of-interest; determine, based on the fluorescence light microscope image stack, whether a region of interest is present in the structure-of-interest; and responsive to determining that the region of interest is present in the structure-of-interest, select the structure-of-interest as the selected structure-of-interest.

In some embodiments of any of the above apparatus, the third logic is further configured to set at least one milling parameter for the charged particle microscope by setting at least one selecting from the group consisting of a milling angle, a milling time, and a milling pattern.

In some embodiments of any of the above apparatus, the third logic is further configured to cause an ion beam instrument to mill the selected structure-of-interest in accordance with the at least one milling parameter.

According to another example embodiment disclosed above, e.g., in reference to any one or any combination of some or all of FIGS. 1-9, provided is an automated method performed via a computing device for providing scientific instrument support, the method comprising the steps of: identifying a subset of candidate structures-of-interest in the lamella sample; selecting, from the subset of candidate structures-of-interest in the lamella sample, a selected structure-of-interest for milling; and setting, based on the selected structure-of-interest for milling, at least one milling parameter for a scientific instrument.

In some embodiments of the above method, the method comprises the step of applying automated image processing to an image representing the lamella sample to segment the image into a plurality of segmented classes. Segmenting the image into a plurality of segmented classes includes segmenting the image into at least one selected from the group consisting of a plurality of structures-of-interest, a plurality of grid squares, a plurality of cracks, a plurality of contaminants, and a background. Identifying the subset of candidate structures-of-interest in the lamella sample includes identifying the subset of candidate structures-of-interest based on the plurality of segmented classes In some embodiments of any of the above methods, identifying the subset of candidate structures-of-interest on the lamella sample comprises: determining, based on the plurality of grid squares, the plurality of cracks, and the plurality of contaminants, a subset of secondary grid squares, wherein each of the subset of secondary grid squares contains one or both of a crack or a contaminant; determining, for each of the plurality of structures-of-interest, a position of the structure-of-interest and a size of the structure-of-interest; determining, for each of the plurality of structures-of-interest, based on the position of the structure-of-interest and the size of the structure-of-interest, whether the structure-of-interest is contained within one of the plurality of grid squares; and identifying the subset of candidate structures-of-interest by, for each of the plurality of structures-of-interest that is contained within one of the plurality of grid squares, selecting the structure-of-interest for inclusion in the subset of candidate structures-of-interest if the structure-of-interest is not located within one of the subset of secondary grid squares.

In some embodiments of any of the above methods, the method comprises the steps of, for each of the plurality of structures-of-interest that is contained within one of the plurality of grid squares: determining a distance between the structure-of-interest and a grid bar of the grid square containing the structure-of-interest; and excluding the structure-of-interest from the subset of candidate structures-of-interest if the distance between the structure-of-interest and the grid bar is below a grid bar distance threshold.

In some embodiments of any of the above methods, the method comprises the steps of: applying automated image processing to the image to further segment the image into a grid edge; and, for each of the plurality of structures-of-interest that is contained within one of the plurality of grid squares: determining a distance between the structure-of-interest and the grid edge; and excluding the structure-of-interest from the subset of candidate structures-of-interest if the distance between the structure-of-interest and the grid edge is below a grid edge distance threshold.

In some embodiments of any of the above methods, the method comprises the steps of, for each of the plurality of structures-of-interest that is contained within one of the plurality of grid squares: determining a distance between the structure-of-interest and another of the plurality of structures-of-interest contained with the same grid square as the structure-of-interest; and excluding the structure-of-interest from the subset of candidate structures-of-interest if the distance between the structure-of-interest and another of the plurality of structures-of-interest contained with the same grid square is below a structure-of-interest distance threshold.

In some embodiments of any of the above methods, the method comprises the steps of, for each of the plurality of structures-of-interest that is contained within one of the plurality of grid squares: determining a milling zone for the structure-of-interest based on the position of the position of the structure-of-interest and a location of a milling beam emitter; determining whether any of the plurality of structures-of-interest is present in the milling zone; determining whether any of the plurality of contaminants is present in the milling zone; and responsive to determining that one or both of a structure-of-interest or a contaminant is present in the milling zone, excluding the structure-of-interest from the subset of candidate structures-of-interest.

In some embodiments of any of the above methods, selecting a selected structure-of-interest for milling includes selecting the selected structure-of-interest based on which of the plurality of structures-of-interest that is contained within one of the plurality of grid squares is located closest to a center of the grid square containing the structure-of-interest.

In some embodiments of any of the above methods, selecting a selected structure-of-interest for milling includes, for each of the plurality of structures-of-interest that is contained within one of the plurality of grid squares: acquiring a fluorescence light microscope image stack for the structure-of-interest; determining, based on the fluorescence light microscope image stack, whether a region of interest is present in the structure-of-interest; and responsive to determining that the region of interest is present in the structure-of-interest, selecting the structure-of-interest as the selected structure-of-interest.

In some embodiments of any of the above methods, the method comprises the steps of: acquiring the image representing the lamella sample by causing the scientific instrument to scan the lamella sample with sample with at least one selected from the group consisting of an electron beam of the scientific instrument and an ion beam of the scientific instrument.

In some embodiments of any of the above methods, the method comprises the step of: controlling a dual-beam instrument to mill the selected structure-of-interest using an ion beam of the dual-beam instrument.

In some embodiments of any of the above methods, applying automated image processing to segment the image includes processing the image with a convolutional neural network trained using a plurality of annotated images of lamella samples.

According to yet another example embodiment disclosed above, e.g., in reference to any one or any combination of some or all of FIGS. 1-9, provided are one or more non-transitory computer readable media having instructions thereon that, when executed by one or more processing devices of a support apparatus for the dual-beam instrument, cause the support apparatus to perform an automated method comprising the steps of: determining, based on the plurality of grid squares, the plurality of cracks, and the plurality of contaminants, a subset of secondary grid squares, wherein each of the subset of secondary grid squares contains one or both of a crack or a contaminant; determining, for each of the plurality of structures-of-interest, a position of the structure-of-interest and a size of the structure-of-interest; determining, for each of the plurality of structures-of-interest, based on the position of the structure-of-interest and the size of the structure-of-interest, whether the structure-of-interest is contained within one of the plurality of grid squares; and identifying the subset of candidate structures-of-interest by, for each of the plurality of structures-of-interest that is contained within one of the plurality of grid squares, selecting the structure-of-interest for inclusion in the subset of candidate structures-of-interest if the structure-of-interest is not located within one of the subset of secondary grid squares.

According to yet another example embodiment disclosed above, e.g., in reference to any one or any combination of some or all of FIGS. 1-9, provided is a scientific instrument, comprising: an electron-beam instrument; an ion-beam instrument; and a computing device. The computing device is configured to: control the electron-beam instrument to acquire an image representing a lamella sample; apply automated image processing to the image to segment the image into a plurality of segmented classes; identify, from the plurality of segmented classes, a subset of candidate structures-of-interest in the lamella sample; select, from the subset of candidate structures-of-interest in the lamella sample, a selected structure-of-interest for milling; and control the ion-beam instrument to mill the selected structure-of-interest.

The invention claimed is:

1. A support apparatus for a charged particle microscope, the support apparatus comprising:
   a first logic configured to apply automated image processing to an image representing a lamella sample to segment the image into a plurality of segmented classes;
   a second logic configured to:
      identify, based on the plurality of segmented classes, a subset of candidate structures-of-interest in the lamella sample; and
      select, from the subset of structures-of-interest in the lamella sample, a selected structure-of-interest for milling by eliminating, based on the plurality of segmented classes, structures-of-interest from the subset of structures-of-interest;
   a third logic configured to set, based on the selected structure-of-interest for milling, at least one milling parameter for the charged particle microscope; and
   wherein the plurality of segmented classes includes at least one selected from the group consisting of a plurality of structures-of-interest, a plurality of grid squares, a plurality of cracks, a plurality of contaminants, and a background.

2. The support apparatus of claim 1, wherein the first logic, the second logic, and the third logic are implemented by a common computing device.

3. The support apparatus of claim 1, wherein at least one of the first logic, the second logic, and the third logic are implemented in the charged particle microscope.

4. The support apparatus of claim 1, wherein the first logic is further configured to:
   acquire the image representing the lamella sample by causing the charged particle microscope to scan the lamella sample with at least one selected from the group consisting of an electron beam of the charged particle microscope and an ion beam of the charged particle microscope.

5. The support apparatus of claim 1, wherein the second logic is further configured to:
   determine, based on the plurality of grid squares, the plurality of cracks, and the plurality of contaminants, a subset of secondary grid squares, wherein each of the subset of secondary grid squares contains one or both of a crack or a contaminant;
   determine, for each of the plurality of structures-of-interest, a position of the structure-of-interest and a size of the structure-of-interest;
   determine, for each of the plurality of structures-of-interest, based on the position of the structure-of-interest and the size of the structure-of-interest, whether the structure-of-interest is contained within one of the plurality of grid squares; and
   eliminate, based on the plurality of segmented classes, structures-of-interest from the subset of structures-of-interest by, for each of the plurality of structures-of-interest that is contained within one of the plurality of grid squares, selecting the structure-of-interest for inclusion in the subset of candidate structures-of-interest if the structure-of-interest is not located within one of the subset of secondary grid squares.

6. The support apparatus of claim 5, wherein the second logic is further configured to:
   for each of the plurality of structures-of-interest that is contained within one of the plurality of grid squares:
   determine a distance between the structure-of-interest and another of the plurality of structures-of-interest contained with the same grid square as the structure-of-interest; and
   eliminate, based on the plurality of segmented classes, structures-of-interest from the subset of structures-of-interest by excluding the structure-of-interest from the subset of candidate structures-of-interest if the distance between the structure-of-interest and another of the plurality of structures-of-interest contained with the same grid square is below a structure-of-interest distance threshold.

7. The support apparatus of claim 5, wherein the second logic is further configured to:
   select a selected structure-of-interest for milling by selecting the selected structure-of-interest based on which of the plurality of structures-of-interest that is contained within one of the plurality of grid squares is located closest to a center of the grid square containing the structure-of-interest.

8. The support apparatus of claim 1, wherein the third logic is further configured to:
   a third logic configured to set at least one milling parameter for the charged particle microscope by setting at least one selecting from the group consisting of a milling angle, a milling time, and a milling pattern.

9. The support apparatus of claim 1, wherein the third logic is further configured to:
   cause an ion beam instrument to mill the selected structure-of-interest in accordance with the at least one milling parameter.

10. An automated method performed via a computing device for providing scientific instrument support, the method comprising:
    applying automated image processing to an image representing a lamella sample to segment the image into a plurality of segmented classes;
    identifying, based on the plurality of segmented classes, a subset of candidate structures-of-interest in the lamella sample, wherein subset of candidate structures-of-interest includes a subset of candidate cells;
    selecting, from the subset of candidate structures-of-interest in the lamella sample, a selected structure-of-interest for milling by eliminating, based on the plurality of segmented classes, structures-of-interest from the subset of structures-of-interest;
    setting, based on the selected structure-of-interest for milling, at least one milling parameter for a charged particle microscope; and
    wherein the plurality of segmented classes including at least two selected from the group consisting of a plurality of structures-of-interest, a plurality of grid squares, a plurality of cracks, a plurality of contaminants, and a background.

11. The method of claim 10, further comprising:
for each of the subset of candidate structures-of-interest:
determining a distance between the structure-of-interest and a grid bar of the grid square containing the structure-of-interest; and
wherein eliminating, based on the plurality of segmented classes, structures-of-interest from the subset of structures-of-interest includes excluding the structure-of-interest from the subset of candidate structures-of-interest if the distance between the structure-of-interest and the grid bar is below a grid bar distance threshold.

12. The method of claim 10, wherein the plurality of segmented classes further includes a grid edge, and the method further comprises:
for each of the subset of candidate structures-of-interest:
determining a distance between the structure-of-interest and the grid edge; and
wherein eliminating, based on the plurality of segmented classes, structures-of-interest from the subset of structures-of-interest includes excluding the structure-of-interest from the subset of candidate structures-of-interest if the distance between the structure-of-interest and the grid edge is below a grid edge distance threshold.

13. The method of claim 10, further comprising:
for each of the subset of candidate structures-of-interest:
determining a milling zone for the structure-of-interest based on the position of the position of the structure-of-interest and a location of a milling beam emitter;
determining whether any of the plurality of structures-of-interest is present in the milling zone;
determining whether any of the plurality of contaminants is present in the milling zone; and
wherein eliminating, based on the plurality of segmented classes, structures-of-interest from the subset of structures-of-interest includes, responsive to determining that one or both of a structure-of-interest or a contaminant is present in the milling zone, excluding the structure-of-interest from the subset of candidate structures-of-interest.

14. The method of claim 10, wherein selecting a selected structure-of-interest for milling comprises:
for each of the subset of candidate structures-of-interest:
acquiring a fluorescence light microscope image stack;
determining, based on the fluorescence light microscope image stack, whether a region of interest is present in the structure-of-interest; and
responsive to determining that the region of interest is present in the structure-of-interest, selecting the structure-of-interest as the selected structure-of-interest.

15. The method of claim 10, further comprising:
acquiring the image representing the lamella sample by acquiring the image from an optical microscope.

16. The method of claim 10, wherein applying automated image processing to segment the image includes processing the image with a convolutional neural network trained using a plurality of annotated images of lamella samples.

17. One or more non-transitory computer readable media having instructions thereon that, when executed by one or more processing devices of a scientific instrument support apparatus, cause the scientific instrument support apparatus to perform the method of claim 10.

18. A charged particle microscope, comprising:
an electron-beam instrument;
an ion-beam instrument; and
a computing device configured to:
control the electron-beam instrument to acquire a data set representing a lamella sample,
segment the data set into a plurality of segmented classes,
identify, from the plurality of segmented classes, a subset of candidate structures-of-interest in the lamella sample,
select, from the subset of candidate structures-of-interest in the lamella sample, a selected structure-of-interest for milling by eliminating, based on the plurality of segmented classes, structures-of-interest from the subset of structures-of-interest,
control the ion-beam instrument to mill the selected structure-of-interest; and
wherein the plurality of segmented classes includes at least one selected from the group consisting of a plurality of structures-of-interest, a plurality of grid squares, a plurality of cracks, a plurality of contaminants, and a background.

* * * * *